United States Patent [19]

Hirschmann

[11] 3,867,348

[45] Feb. 18, 1975

[54] CROSS-LINKING AGENT, CROSS-LINKING COMPOSITION CONTAINING SAME, THEIR PRODUCTION AND THEIR USE IN THE TEXTILE INDUSTRY

[75] Inventor: Alexandre Hirschmann, Stains, France

[73] Assignee: Novel Hoechst Chimie, Puteaux, Hauts-de-Seine, France

[22] Filed: Nov. 17, 1972

[21] Appl. No.: 307,361

[30] Foreign Application Priority Data
Nov. 29, 1971  France.............................. 71.42745

[52] U.S. Cl............. 260/70 R, 8/116.3, 117/139.4, 260/70 M, 260/71, 260/851
[51] Int. Cl............................ C08g 9/10, C08g 9/34
[58] Field of Search......... 260/851, 70 R, 70 M, 71, 260/72 R

[56] References Cited
UNITED STATES PATENTS

| | | | |
|---|---|---|---|
| 2,718,515 | 9/1955 | Thomas | 260/851 |
| 3,535,148 | 10/1970 | Ravve | 260/851 |
| 3,585,172 | 6/1971 | Nishiyama et al. | 260/851 |

FOREIGN PATENTS OR APPLICATIONS 1,114,504   4/1956   France

Primary Examiner—John C. Bleutge
Attorney, Agent, or Firm—Karl W. Flocks

[57] ABSTRACT

A copolymer cross-linking agent comprises at least one unsaturated N-substituted amide of an $\alpha,\beta$-unsaturated carboxylic acid which cannot be methylolated the substituent of which is an aliphatic moiety containing a diol-1,2 or -1,3 group, the amide corresponding to the general formula:

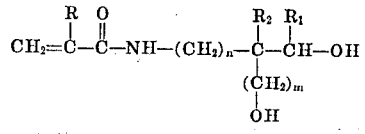

wherein R is selected from the group comprising hydrogen and an alkyl radical: $R_1$ is selected from the group comprising hydrogen and a $C_1$–$C_3$ alkyl radical; $R_2$ is selected from the group comprising hydrogen, methyl and ethyl radical; $m$ is an integer from 0 to 1 and $n$ is an integer from 0 to 1, and at least one nitrogen methylolated compound selected from the group comprising urea, its substituted derivatives and cyclic ureas.

4 Claims, No Drawings

CROSS-LINKING AGENT, CROSS-LINKING COMPOSITION CONTAINING SAME, THEIR PRODUCTION AND THEIR USE IN THE TEXTILE INDUSTRY

The present invention relates to a new cross-linking agent, a composition containing such an agent and itself capable of bringing about a cross-linking reaction. The invention also relates to a process for obtaining such an agent and such a composition and their use in the textile industry.

Copolymers capable of being made insoluble by cross-linking have been known for a long time. This cross-linking is usually obtained by introducing in the mixture of monomers to be co-polymerized a monomer comprising a reactive group such as carboxyl, amide, epoxy or hydroxyl group. Certain polymers may be cross-linked merely by heating, usually in the presence of an acidic catalyst or one capable of releasing an acid; this is the case, for example, of acrylic, vinyl and acrylovinyl copolymers containing, as cross-linking agents, methylol-amides of unsaturated organic acids such as acrylic, methacrylic and maleic acids.

The present invention provides, as a new industrial product, a new complex cross-linking agent containing, as an unsaturated monomer, an N-substituted unsaturated amide non belonging to the methylol amide class.

The invention also provides a cross-linking and/or cross-linkable composition containing such cross-linking agent.

The cross-linking agent according to the invention is obtained by reacting in an alkaline medium formaldehyde with a mixture of an N-substituted unsaturated amide which cannot be methylolated and another nitrogen compound having hydrogen atoms capable of being replaced by a methylol group such as urea, its substituted derivatives and cyclic ureas; the molecular ratio of this nitrogen compound to the unsaturated monomer may vary within a wide range without, however, exceeding 5 molecules of nitrogen compound for 1 molecule of unsaturated amide. The quality of formol used is at most equal to the molecular quantity which could theoretically be fixed to the nitrogen atoms of the added nitrogen compounds, except for the nitrogen of the N-substituted unsaturated amide, since the latter cannot be methylolated under operative conditions applied.

The N-substituted unsaturated amide used in the cross-linking agent of the invention is an N-substituted amide of an α,β-unsaturated carboxylic acid, the substituent of which is an aliphatic moiety comprising a dihydric alcohol-1,2 or -1,3 group of general formula:

$$CH_2=C(R)-C(O)-NH-(CH_2)_n-C(R_2)(R_1)-CH-OH$$
$$\phantom{CH_2=C(R)-C(O)-NH-(CH_2)_n-C(R_2)(R_1)-}|\phantom{xx}$$
$$\phantom{CH_2=C(R)-C(O)-NH-(CH_2)_n-C(R_2)(R_1)-}(CH_2)_m$$
$$\phantom{CH_2=C(R)-C(O)-NH-(CH_2)_n-C(R_2)(R_1)-}|\phantom{xx}$$
$$\phantom{CH_2=C(R)-C(O)-NH-(CH_2)_n-C(R_2)(R_1)-}OH$$

wherein R can be H or an alkyl radical, $R_1$ can be H or a $C_1$-$C_3$ alkyl radical, $R_2$ can be H, a methyl or ethyl radical, $m = 0$ or 1 and $n = 0$ or 1.

The following compounds are given by way of example:

Acrylamido-1 propanediol-2,3
Acrylamido-2 propanediol-1,3
Acrylamido-2 methyl-2 propanediol-1,3
Methacrylamido-1 propanediol-2,3
Methacrylamido-2 methyl-2 propanediol-2,3.

The preferred monomer is the methacrylamido-1 propanediol-2,3. The above unsaturated monomers can be obtained using the method disclosed in French Pat. No. 1 114 504 by the action of an α,β-unsaturated carboxylic acid chloride on a primary dihydroxyalkylamine the hydroxyl groups of which are protected by acetalizing.

Surprisingly, the methacrylamido-1 propanediol-2,3 as well as the acrylamido-1 propanediol-2,3 may also be obtained by the action of ammonia on the glycidyl ester of the corresponding acid.

This method, which is simpler than the usual process, comprises, in a first state, reacting the excess ammonia with the glycidyl ester at a temperature lower than boiling temperature, then eliminating the excess ammonia; the yield of this reaction is close to the theoretical value; it is supposed to occur as follows:

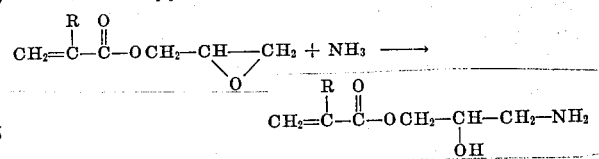

the latter compound immediately undergoing an intramolecular rearrangement to give;

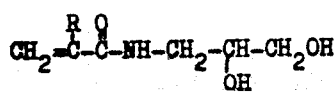

The cross-linking agent according to the invention can advantageously be included in a cross-linking and-/or crosslinkable composition, in particular in a copolymer, the crosslinking properties of which are conferred upon it by said agent.

Thus, the presence in this cross-linking agent of an unsaturated monomer enables it to be polymerized or copolymerized with other monomers, which retaining its cross-linking activity. It is probable that during this polymerization, which takes place in an acidic medium, at least one portion of the methylol groups of the added saturated nitrogen compound reacts with the hydroxly groups of the monomer or the polymers or copolymers already formed to constitute ether bridges, and fixed thus fiixed onto the macromolecules for, as will be shown further on, the composition according to the invention does not behave in the same way as a simple mixture.

Advantageously, the monomers that may be copolymerized with the cross-linking reaction, comprise acrylic monomers, vinyl ethers or esters, acrylic acid, acrylonitrile, styrene or olefins. Mixtures of these monomers can also be used.

The copolymerization of the cross-linking agent with other unsaturated monomers is carried out in an acidic medium, in emulsion or in solution according to known processes, in the presence of a peroxide compound or Redox system. The proportion of cross-linking agent introduced into the copolymer may vary for 0.1 to 25 percent, preferably from 6 to 12 percent in terms of solids based on the solids of the solution or the emulsion.

The cross-linking and/or cross-linkable copolymers are obtained by copolymerizing the previously prepared crosslinking agent.

The choice of monomers used in the copolymerization enables the modification of some physical properties of the substances obtained after cross-linking, such as flexibility and hardness.

The cross-linking properties may usefully be reinforced by introducing in the copolymer reactive groups, such as hydroxyl, carboxylic groups or others.

The cross-linking effect can also be reinforced by adding known catalysts such as ammonia salts or organic or inorganic acid salts of metals having several valences, suc as Mg, Zn, Ca, Al, Zr chlorides and nitrates, or even the acids themselves such as maleic, oxalic, citric acids and the like.

To show the ability of the cross-linking and/or cross-linkable compositions of the invention to cross-link, the applicant has demonstrated their capability of producing organic solvent resisting films simply by heating. Heating gives rise to cross-linking among the copolymer macromolecules themselves or between the macromolecules of the copolymer.

The properties of the cross-linking and/or crosslinkable compositions of the invention make them particularly suitable for the textile industry. Indeed, these compositions can be used to produce non-woven fabrics or to improve the effects of the crease resistant finishes of fabrics. More particularly, they make it possible to obtain non-woven fabrics having good resistance to organic solvents, particularly to tri- and perchloroethylene, and to improve abrasion and crease resistance as well as resistance to washing of crease resistance finishes.

The following examples are given by way of illustration and in no way limit the scope of the invention.

Example 1 : preparation of methacrylamido-1 propanediol-2,3,

In a suitable vessel, 100 cm³ of ammonia at 22°B. (1,15 molecules) are added to 142 g of glycidyl methacrylate (1 molecule). The mixture is stirred and heated for 1 hour at 50°C, then for 30 mn at 40°–45°C. The product obtained is clear, homogeneous and may be water-diluted. The excess ammonia is then eliminated according to known processes, to obtain an aqueous solution of the monomer at a concentration of 53 percent.

Example 2 : preparation of a cross-linking agent.

A solution of N-dihydroxy-2,3 propyl methacrylamide is prepared according to example 1.120 g of urea (2 molecules) and 256 g of a 47 percent formalehyde solution (4 molecules) are added to this solution. After adjusting the pH to 8.6–8.8, the solution is heated with stirring for 1 hour at 50°C, and again for 30 min at 40°C. After adjusting the pH to 7.5–7.8, concentration is brought down to 40 percent by dilution. The solution obtained is limpid, and can be water-diluted.

Example 3 Preparation of cross-linking agent.

A solution of N-dihydroxy-2,3-propylmethacrylamide is prepared according to example 1. 142 g of glycolurile acetyenediureine (1 moleclue), 192 g of a 47 percent formaldehyde solution (3 molecules) and 100 cm₃ of water are added to this solution. After adjusting the pH to 8.6–8.8 with soda, stirring is maintained for 1 hour at 50°C, then for 30 min. at 40°C. A clear solution, which can be water-diluted, is thus obtained.

Example 4: Preparation of a cross-linking agent.

A solution of glyoxal mono-ureine is prepared in the following manner: 145 g of a 40 percent glyoxal solution (1 molecule) is placed in a suitable device and cooled to 18°C; the pH is adjusted to 5.4–5.6 by slowly adding a 10 percent soda solution. 60 g of urea (1 molecule) is slowly introduced batchwise over 30 minutes while maintaining the temperature at approximately 20°C and stirring. It is then maintained for 4 hours at room temperature.

By dosing the free glyoxal, it is checked that the rate of conversion is a least equal to 90 percent. A solution of N-dihydroxy 2,3-propylemethacrylamide, prepared according to example 1 and 128 g of a 47 percent formaldehyde solution (2 molecules) are added to the solution obtained. The pH is adjusted to 8.6–8.8 with 10 percent soda, then heated for 1 hour at 50°C and again for 30 minutes at 40°C. After adjusting the pH to 7.8, concentration is brought to 40 percent by diluting with water. The solution obtained is clear, and may be water-diluted.

Example 5: : Preparation of a cross-linking agent.

86 g of ethylene-urea (1 molecule) and 128 g of a 47 percent formaledhyde solution (2 molecules) are added to a solution of N-dihydroxy-2,3-propylmethacrylamine prepared according to example 1. After mixing, the pH is brought to 8.6–8.8 with 10 percent soda. This is maintained for 1 hour at 50°C and 20 minutes at 40°. After bringing down the pH to 7.6–7.8, concentration is brought down to 400 percent by diluting with water. A clear, slightly yellowish solution, which can be water-diluted, is obtained.

Example 6: The following are placed in a vessel comprising a propeller stirrer:

| | |
|---|---|
| deionized and deoxygenated water | 475 parts |
| 16% alkylbenzene sulphonate | 32 parts |
| fatty alcohol-ethylene oxide condensate in 25% solution | 32 parts |
| dihydrogen sodium phosphate | 08 parts |
| phosphoric acid | 02 parts |
| ammonium persulphate | 12 parts |

After complete dissolution, 270 parts are placed in a reactor suitable for preparing emulsions.

The following are added to the remaining solution:

| | |
|---|---|
| acrylic acid | 8 parts |
| methyl methacrylate | 40 parts |
| butyl acrylate | 32 parts |
| ethyl acrylate | 272 parts | and the whole is emulsified to obtain a pre-emulsion of monomers.

The bottom of the reactor is heated to 75°C and the monomer pre-emulsion is simultaneously poured with 120 parts of the cross-linking agent of example 2. The flow rates are adjusted so as to end at the same time in order to avoid an excessive reflux (86–88°C). After pouring, stirring for 50 minutes deodorizing by an air or inert gas current and cooling are carried out. The pH is adjusted to 5.5–6.0 and then filtering is carried out. The emulsion obtained has a 40 percent dry extract; there is little sediment and the dispersion is void of lumps.

A layer of the emulsion spread of a glass plate gives a colorless, fairly flexible and highly resistant film after drying a room temperature. When placed in trichloroethylene, the film does not dissolve and retains a certain resistance. After heat treatment of 10 minutes at 135–140°C, the film absorbs little trichloroethylene and becomes very resistant.

Example 7

The following are placed in a recipient provided with a propeller stirrer:

| | |
|---|---|
| deionized and deoxygenated water | 480 parts |
| 16% sodium alkylarylsulphonate | 32 parts |
| fatty alcohol and ethylene oxide condensate in 25 % solution | 32 parts |
| dehydrogen sodium phosphate | 0,8 parts |
| ammonium persulphate | 1 part |

After complete dissolution, 200 parts of this solution are placed in a reactor suitable for preparing emulsions.

The following is added to the remaining solution:

| | |
|---|---|
| Acrylic acid | 4 parts |
| methyl methacrylate | 48 parts |
| ethyl acrylate | 260 parts | and the whole is then emulsified. 50 parts of this emulsion are added to the 200 parts of emulsifier solution in the reactor in order to form a bottom. The latter is heated to 72 C and 10 parts of the cross-linking agent of example 4 are introduced; the temperature is brought to 82°C to start the reaction. The monomer emulsion and 100 parts of the cross-linking agent of example 4 are simultaneously poured into the reactor, at a temperature of 86–88°C, with avoiding an excessive reflux.

The addition rate is regulated so that the pouring of the monomer emulsion and the addition of the cross-linking agent are completed at the same time.

After stirring for 1 hour, deodorisation is carried out by air or inert gas bubbling, followed by cooling. The pH is adjusted to 5.5–6.0 with an alkaline agent. The emulsion obtained contains a 40 percent dry extract.

A layer of this emulsion spread on a glass plate and dried at room temperature gives a colourless, flexible, adhesive and resistant film. When immersed in trichlorethylene, this film does not dissolve and remains quite resistant. After heat treatment for 10 minutes at 135–140°C, it becomes very resistant and absorbs little solvent.

Example 8:

the following is placed in a vesel provided with a propeller stirrer:

| | |
|---|---|
| deionized and deoxygenated water | 450 parts by weight |
| 15% sodium dodecybenzenesulphonate | 43 parts |
| condensate of fatty alcohol with 25 moles of 25% ethylene oxide solution | 9 parts |
| Condensate of alkylphenol with 35–40 moles of 25% ethylene oxide solution | 9 parts |
| dihydrogen sodium phosphate | 0,7 parts |
| potassium persulphate | 1,1 parts |

After complete dissolution, 130 parts of this solution are placed in a polymerization reactor suitable for preparing dispersions.

The following is added to the remaining solution:

| | |
|---|---|
| methacrylic acid | 8,6 parts |
| acrylonitrile | 34,5 parts |
| ethyl acrylate | 353 parts | and the whole is emulsified to obtain a monomer pre-emulsion.

In the polymerization reactor, a bottom is formed by adding 130 parts of the monomer pre-emulsion to the 130 parts of emulsifier solution.

This is heated at 65°C for 15 minutes, then at 82°C to geth the polymerization reaction well under way and the monomer pre-emulsion is poured simultaneously with 86 parts of 40 percent cross-linking agent obtained in example 2. These pouring operations are regulated so that they end at the same time and to avoid an excessive reflux (86°–88°C).

Stirring is then carried out for 1 hour to complete the polymerization, followed by deodorizing by an air or inert gas current and the dispersion obtained is cooled. After adjusting the pH to 5.5–6.0, filtration is carried out.

A dispersion with a 43 ± 1 percent dry extract is obtained. The sediment is negligible and the dispersion is void of lumps.

The dispersion is spread on a glass plate and gives a colourless, quite flexible and resilient film after drying at room temperature. When placed in trichloroethylene, the film is insoluble and retains a certain resistance. After heat treatment for 10 minutes at 135–140°C, the film absorbs little trichloroethylene and possesses good resistance.

Example 9

In order to compare the above mentioned dispersions, a standard dispersion containing no-cross linking agent is prepared.

The following are placed in a recipient provided with a propeller stirrer:

| | |
|---|---|
| deionized and deoxygenated water | 510 parts by weight |
| 15% sodium dodecylbenzene sulphonate | 43 parts |
| condensate of fatty alcohol with 25 moles of 25% ethylene oxide solution | 9 parts |
| condensate of alkyphenol with 35–40 moles of 25% ethylene oxide solution | 9 parts |
| dihydrogen sodium phosphate | 0,7 parts |
| potassium persulphate | 1,1 parts |

After complete dissolution, 140 parts of this solution are placed in a polymerization reactor suitable for preparing dispersions.

The following are added to the remaining solution:

| | |
|---|---|
| acrylic acid | 8,6 parts |
| acrylonitril | 34,5 parts |
| ethyl acrylate | 387 parts | and the whole is emulsified to obtain a monomer pre-emulsion.

A bottom is constituted in the polymerization reactor by adding 120 parts of the monomer pre-emulsion to the 140 parts of the emulsifier solution.

This bottom is heated at 65°C for 15 minutes, then at 82°C to get the polymerization reaaction well under way; the monomer pre-emulsion is then poured at 86–88°C.

Stirring is then carried out to complete polymerization, followed by deodorizing by an air or inert gas current and the dispersion obtained is cooled. After adjusting the pH to 5.5–6.0, filtration is carried out. A dispersion with a 43 ±1 percent dry extract is obtained. The sediment is negligible and the dispersion free of lumps. When spread on a glass plate and after drying at room temperature, the dispersion gives a colourless, flexible and resilient film. When placed in trichloroethylene, this film is soluble, even after heat treatment for 10 minutes at 135–140°C.

Example 10: Bonding non woven fabric by impregnation.

A mat of non woven fabric constituted by a 80/20 viscose/polyamide mixture weighing 70 g/m2 is used. The baths used for impregnation were padded with at 900 percent expression rate.

Two bath formulae were used, containing:

A -38.5 g/l of acrylic emulsion with 43 percent active materials 5 g/l of 25 percent sodium dodecylbenzenesulphonate, which corresponds to a (dry) binder/fibre ratio of approximately 15 percent.

B - 77 g/l of acrylic emulsion with 43 percent active materials, 5 g/l of 25 percent sodium dodecylbenzenesulphonate, which corresponds to a (dry) binder/fibre ratio of approximately 30 percent.

The following baths are prepared according to each of the above mentionned formulae:

$A_1$, $B_1$ acrylic emulsion of the invention according to example 8.

$A_2$, $B_2$ acrylic emulsion of example 9 of identical composition but containing no cross-linking agent.

After padding and expressing, the mats are dried at 100°C, then heated at 150°C for 4 minutes. Then, the breaking strength of the non woven fabric obtained is determined according to the German DIN 53 112 specification by means of a Lhomargy DM 01 dynamometer, with samples 15 mm ±0.1 wide, their length being such that the free length between the dynamometer jaws is 50 mm ± 00.1.

The breaking strength measurements are carried out on samples having undergone the following treatments;

1. 24 hour conditioning at 20°C ± 1°C; air mositure content: 65 percent ±2 percent
2. imersion for 1 hour in perchloroethylene at 20°C
3. immersion for 1 hour in trichloroethylene at 20°C.

The breaking strengths measured are indicated in the following table in terms of breaking length expressed in metres.

| Formula A (binder/fibre ratio approximately 15%) Breaking length, m | $A_1$ | $A_2$ |
|---|---|---|
| conditioned sample | 1150 | 740 |
| after immersion in perchloroethylene | 450 | 60 |
| after immersion in trichloroethylene | 270 | destroyed by swelling |

| Formula B (binder/fibre ratio approximately 30%) Breaking length, m | $B_1$ | $B_2$ |
|---|---|---|
| conditioned sample | 1810 | 1360 |
| after immersion in perchloroethylene | 880 | 80 |
| after immersion in trichloroethylene | 650 | destroyed by swelling |

It is thus clear that the cross-linking agent considerably increases solvent resistance.

Example 11: Improved effects of crease-resistant finishes.

A comparison was made between crease-resistance finishes obtained with a dimethylolated dihydroxy ethylene urea resin alone and those obtained with the same resin to which a composition according to the invention was added. The tests were carried out on poplin cotton of 130 g/m2 with padding, the squeezing rate being 75 percent.

The compositions used contained the following:

```
A — Standard formula
45% dimethylol dihydroxy ethylene urea resin    100 g
Cl2 Mg, 6H2O                                     12 g
Water — sq                                        1 l
B — Acrylic emulsion, 43% active materials       25 g
45% dimethylol dihydroxy ethylene urea resin    100 g
Cl2 Mg, 6H2O                                     12 g
Water — sq                                        1 l
C — Acrylic emulsion, 43% active materials       50 g
45% dimethylol dihydroxy ethylene urea resin    100 g
Cl2 Mg, 6 H2O                                    12 g
Water — sq                                        1 l
```
$B_1$, $C_1$ the acrylic emulsion used is the one of example 9.
$B_2$, $C_2$ the acrylic emulsion used is the one of example 10 (without cross-linking agent).

The solutions were adjusted to pH 5.5 with acetic acid. After padding and squeezing, the poplin samples were dried at 120°C, then heated at 150°C for 4 minutes.

The following measurements were then made on samples conditioned for 24 hours at 20°C ± 1°C and with a relative air moisture of 65 percent ± 2 percent.

a. Loss of weight through abrasion: A.A.T.C.C. 93 - 1970 specification with an "Atlas Electric Devices Co" accelerator using an engraved metal ring as an abrasive disk. Test duration: 7 minutes.

b. dry crease recovery: "Monsanto" angles measured according to A.A.T.C. 66 — 1968 specification.

The angle is again measured after washing at 60°C, according to A.A.T.C.C. 88 b - 1969 specification.

The results obtained are given in the following table:

| Measurement | A standard | B | $B_2$ | $C_1$ | $C_2$ |
|---|---|---|---|---|---|
| Abrasion loss, percent | 28 | 23 | 27 | 18 | 23 |
| Dry crease recovery "Monsanto" angles: Initially: Warp / Weft | 140 / 142 } 282 | 149 / 151 } 300 | 144 / 144 } 288 | 147 / 157 } 304 | 144 / 146 } 290 |
| After 3 washes at 60°C.: Warp / Weft | 125 / 131 } 256 | 131 / 141 } 272 | 130 / 130 } 260 | 138 / 143 } 281 | 136 / 133 } 269 |

By using acrylic emulsion (tests $B_1$, $B_2$, $C_1$, $C_2$) in addition to the crease resistant finish (A test) loss of weight through abrasion is reduced and the crease recovery angle is increased. The use of acrylic emulsion according to the invention ($B_1$, $C_1$ tests) gives better results than the same acrylic resins without cross-linking agent ($B_2C_2$ tests) especially as regards resistance to washing.

EXAMPLE 12

A comparison was made between resistance of non woven fabrics such as those described in example 10, and which were impregnated and treated as in example 10, with on the one hand, a bath having a composition identical to that of formula $B_1$ of this example and, on the other hand, a bath of formula $C_1$ containing, at the same concentrations as for formula $B_1$, a mixture of dimethylol urea with a copolymer containing only the N-dihydroxy-2,3 propyl methacrylamide as cross-linking agent.

The results of the breaking resistance measurements, in terms of breaking length (m), are given in the table below:

| Breaking length, metre | $B_1$ | $C_1$ |
| --- | --- | --- |
| Conditioned sample | 1926 | 1685 |
| after immersion in water | 656 | 548 |
| after immersion in perchloroethylene | 910 | 770 |
| after immersion in trichloroethylene | 472 | 298 |

The results show that the breaking resistance obtained is much greater when a composition according to the invention is used instead of a simple mixture of the same compounds, this being the case both for initial resistance and resistance after immersion in water or in organic solvents.

I claim:

1. A copolymer cross-linking agent comprising at least one product obtained by reacting for a time sufficient to obtain said agent, at a temperature of 40°C. to 100°C. and in an aqueous alkaline medium at a pH on the order of about 8.6–8.8, formaldehyde with a mixture of a non-methylolable unsaturated N-substituted amide of $\alpha, \beta$-unsaturated carboxylic acid, the substituent of which is an aliphatic moiety containing a diol-1, 2 or 1,3 group, the amide corresponding to the general formula:

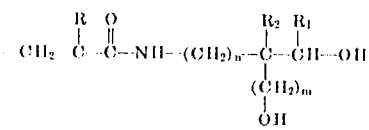

wherein R is hydrogen or alkyl: $R_1$ is hydrogen or a $C_1$–$C_3$ alkyl; $R_2$ is hydrogen, methyl or ethyl; $m$ is an integer from 0 to 1 and $n$ is an integer from 0 to 1 and at least one nitrogen methylolable compound selected from the group consisting of urea, its substituted derivates and cyclic ureas, the quantity of formaldehyde used being at most equal to the molecular quantity which could theoretically be fixed to said methylolable nitrogen compound and the minimum quantity of formaldehyde being 2 moles per mole of said nitrogen compound, the molecular ratio between said nitrogen compound and said unsaturated N-substituted amide being at most 5 molecules of said nitrogen compound for 1 molecule of said amide.

2. A cross-linking agent in accordance with claim 1 wherein the unsaturated N-substituted amide is methacrylamido-1 propanediol-2,3.

3. Cross-linking agent according to claim 1, wherein the unsaturated N-substituted amide is
   acrylamido-1 propanediol-2,3
   acrylamido-2 propanediol-1,3
   acrylamido-2 methyl-2 propanediol-1,3
   methacrylamido-1 propanediol-2,3; or
   methacrylamido-2 methyl-2 propanediol-1,3.

4. Cross-linking agent according to claim 3, wherein the methacrylamido-1 propanediol-2,3 and the acrylamido-1 propanediol-2,3 are obtained by the action of ammonia on the glycidyl ester of the corresponding acid.

* * * * *

UNITED STATES PATENT OFFICE
CERTIFICATE OF CORRECTION

Patent No. 3,867,348    Dated Feb. 18, 1975

Inventor(s) Alexandre HIRSCHMANN

It is certified that error appears in the above-identified patent and that said Letters Patent are hereby corrected as shown below:

In column 1, cover page, the Assignee's name should read: NOBEL HOECHST CHIMIE

Signed and Sealed this second Day of September 1975

[SEAL]

Attest:

RUTH C. MASON
*Attesting Officer*

C. MARSHALL DANN
*Commissioner of Patents and Trademarks*